United States Patent
Isshiki et al.

(10) Patent No.: US 7,480,216 B2
(45) Date of Patent: Jan. 20, 2009

(54) OPTICAL INFORMATION RECORDING APPARATUS

(75) Inventors: Fumio Isshiki, Yokohama (JP); Kunikazu Ohnishi, Yokosuka (JP); Nobuyuki Maeda, Yokohama (JP); Takahiro Kurokawa, Fujisawa (JP); Takeshi Shimano, Tokorozawa (JP)

(73) Assignee: Hitachi Media Electronics Co., Ltd., Mizusawa-shi (JP)

( * ) Notice: Subject to any disclaimer, the term of this patent is extended or adjusted under 35 U.S.C. 154(b) by 670 days.

(21) Appl. No.: 10/879,080

(22) Filed: Jun. 30, 2004

(65) Prior Publication Data

US 2005/0063259 A1 Mar. 24, 2005

(30) Foreign Application Priority Data

Sep. 22, 2003 (JP) ............... 2003-329296

(51) Int. Cl. *G11B 7/08* (2006.01)
(52) U.S. Cl. .............. 369/44.23; 369/44.27
(58) Field of Classification Search ........ None
See application file for complete search history.

(56) References Cited

U.S. PATENT DOCUMENTS

| | | | | |
|---|---|---|---|---|
| 5,699,330 A | * | 12/1997 | Ogino et al. | 369/44.27 |
| 6,771,584 B2 | * | 8/2004 | Yamanaka | 369/112.23 |
| 7,277,365 B2 | | 10/2007 | Yasuda et al. | |
| 2002/0036958 A1 | * | 3/2002 | Wada et al. | 369/44.23 |
| 2002/0172110 A1 | * | 11/2002 | Tateishi et al. | 369/44.32 |
| 2003/0107961 A1 | * | 6/2003 | Yasuda et al. | 369/44.27 |
| 2004/0174781 A1 | | 9/2004 | Nishi | |
| 2004/0196766 A1 | * | 10/2004 | Tadano | 369/53.23 |
| 2005/0088930 A1 | * | 4/2005 | Minechika et al. | 369/44.29 |

FOREIGN PATENT DOCUMENTS

| | | |
|---|---|---|
| JP | 2001-222838 | 8/2001 |
| JP | 2002-150569 | 5/2002 |
| JP | 2002-324328 | 11/2002 |
| JP | 2003123282 A * | 4/2003 |
| JP | 2003-233917 | 8/2003 |
| WO | WO 02/073610 A1 | 9/2002 |

OTHER PUBLICATIONS

Machine traslation of JP 2003-123282 provided by the Japanese Patent Office website.*
Japanese Office Action issued in corresponding Japanese Patent Application No. 2003-329296, dated Mar. 18, 2008.

* cited by examiner

*Primary Examiner*—Michael V. Battaglia
(74) *Attorney, Agent, or Firm*—Antonelli, Terry, Stout & Kraus, LLP.

(57) ABSTRACT

A rewritable optical disk apparatus, optical information recording and reproducing apparatus or the like is allowed to automatically and properly adjust the optical system to the optimum focal condition regardless of the readout signal detector's positional error and the residual aberration in the optical system. The spherical aberration and defocus are coarsely adjusted using the amplitude (PP amplitude) of the tracking error signal and then finely adjusted using the amplitude (RF amplitude) of the readout signal. Since the spherical aberration can properly be adjusted, it is possible to raise the reliability of the readout signal.

3 Claims, 16 Drawing Sheets

OPTICAL INFORMATION RECORDING APPARATUS

CLAIM OF PRIORITY

The present application claims from Japanese application JP 2003-329296 filed on Sep. 22, 2003, the content of which is hereby incorporated by reference into this application.

BACKGROUND OF THE INVENTION

The present invention relates to optical disk media and optical information recording apparatus which use light to write/read information to/from recording media. In particular, the invention relates to an optical information recording apparatus capable of correcting the sphericalh aberration.

With the progress in density of optical disks and other optical recording media, a typical optical system is employing a larger numerical aperture with shorter wavelength light. Accordingly, aberration due to manufacturing errors of lenses and recording media is becoming a critical problem. For example, the spherical aberration due to the thickness error of a cover layer on a recording medium sharply increases in proportion with the fourth power of the numerical aperture if wavelength is fixed. In addition, the influence of aberration becomes larger in reverse proportion with wavelength $\lambda$ if manufacturing errors and other conditions are the same.

Owing to these factors, recent high density optical information recording apparatus are required to have optical heads provided with spherical aberration correcting capability. Note that in this specification, "optical information recording apparatus" is used to refer to an apparatus which records or reproduces information to or from a recording medium by using the means to irradiate light to a recording medium and the means to detect light from the recording medium.

In the optical information recording apparatus, it is necessary to automatically adjust both focus and spherical aberration of the lens at the same time. If the spherical aberration is adjusted (and changed), the apparent focal point (optimum focal length) of the lens changes a little. (Hereafter, we refer to the intentional change of the focal point (focus offset) as 'defocus.') To reach an optimum condition, it is therefore necessary to change both spherical aberration and defocus concurrently.

If either spherical aberration or defocus is not optimized, the beam spot cannot be reduced enough to allow high-density recording. In addition, manufacturing fluctuations may add astigmatism to the lens and positional errors to the photodetector. In this case, the zero point of the detection signal is deviated, making it impossible to rely on the signal voltage in determining the optimum condition. Therefore, a two-dimensional search or changing both spherical aberration and defocus concurrently is necessary to find the optimum condition. (Hereafter, we refer to the amount of defocus as 'defocus value.')

As such a two-dimensional adjustment method of the spherical aberration and defocus, Japanese Patent Laid-open No. 2002-324328 has proposed a method for two-dimensionally searching the respective values in four or eight rectangular directions. However, this method carries the disadvantage that the search speed is slow and a long waiting time is imposed until a medium becomes available after inserted into the optical disk apparatus (drive).

SUMMARY OF THE INVENTION

It is a first object of the present invention to overcome this problem and provide an optical disk apparatus (optical information recording apparatus) which can adjust the spherical aberration and defocus as quickly as possible so that the user can begin to use an optical disk (medium) without long waiting time after inserted into the optical disk apparatus.

In addition, the prior art methods carry the disadvantage that if an unrecorded disk (medium) is inserted, it is not possible to accurately locate the optimum point by using the readout signal (RF amplitude) without being influenced by manufacturing errors since no marks are recorded.

It is a second object of the present invention to overcome this problem and provide an optical disk apparatus (optical information recording apparatus) that can accurately optimize the spherical aberration and defocus even if the inserted disk (medium) is an unrecorded disk.

In addition, by achieving these objects which ease the limit of manufacture tolerance, the present invention is intended to provide an inexpensive high reliability optical disk apparatus (optical information recording apparatus) capable of recording/reproducing large quantities of information at lower cost.

According to the present invention, the spherical aberration and defocus are adjusted coarsely using the amplitude of the tracking error signal (PP amplitude) and then adjusted finely using the amplitude of the readout signal (RF amplitude). Since changing the spherical aberration in this adjustment changes best focus offset (defocus) that maximizes the amplitude of the tracking error signal, both spherical aberration and defocus are concurrently changed at a constant ratio according to the change ratio of the defocus to the spherical aberration in order to reduce the time spent for the two-dimensional search.

In addition, when an unrecorded optical disk (optical recording medium) is used, marks are written onto the medium after the amplitude of the tracking error signal is roughly maximized by adjusting the spherical aberration and defocus. Then, the spherical aberration and defocus are finely optimized using the amplitude of the readout signal retrieved from the written marks.

A specific configuration to implement them is an optical information recording apparatus comprising: a first detector for detecting the amplitude of the readout signal; a second detector for detecting the amplitude of the tracking error signal; a first adjustor for adjusting the spherical aberration; and a second adjustor for adjust the defocus of the objective lens (such as an object lens actuator); wherein before and after the amplitude of the tracking error signal is detected, the defocus and the spherical aberration are automatically changed concurrently at a constant ratio determined by characteristics of the optical system in searching for the maximum amplitude of the tracking error signal. Ideally, the ratio is in the range of ±60% of the $\Delta t/\Delta z$ value calculated according to the following equation:

$$\Delta z = -\frac{(n^2 - 1)}{4n^3} \cdot (NA)^2 \cdot \Delta t \qquad \text{Equation 1}$$

Where, n is the refractive index of the transparent layer of the recording layer, NA is the numerical aperture of the objective lens, $\Delta t$ is a correction of the spherical aberration and $\Delta z$ is a shift of the focal length of the objective lens (defocus).

In a two dimensional rectangular coordinate system whose respective axes represent the defocus and the spherical aberration, an oblique search is made at first so as to maximize the amplitude of the tracking error signal and then a rectangular search is made so as to maximize the amplitude of the readout signal.

In the case of a rewritable unrecorded optical recording medium is inserted, after adjustment is made to increase the amplitude of the tracking error signal, marks are recorded and then the spherical aberration is adjusted so as to maximize the amplitude of the readout signal.

The recorded marks constitute a repetitive pattern whose mark interval is 2 to 4 times the track interval in the data area.

In addition, the marks recorded for the purpose of adjustment are erased after the amplitude of the readout signal is maximized by adjustment.

According to another aspect of the present invention, optimum spherical aberration and defocus are preliminarily measured at inner and outer tracks or both ends of a medium. Spherical aberration and defocus which are to be set at an intermediary point for information read/write are calculated by interpolation based on the preliminarily measured values. Specifically in the case of a recording card medium, the optical information recording apparatus has a memory for storing the optimum spherical aberration values (and optimum defocus values for the objective lens) which are respectively for four corners on the recording medium; wherein the optimum spherical aberration and defocus values for an information read/write position are calculated from the stored optimum values by interpolation based on the ratios in terms of the position's distances from the four corners.

In the case of a recording disk medium, the optical information recording apparatus has a memory for storing the optimum spherical aberration values (and optimum defocus values for the objective lens) which are respectively for inner and outer tracks on the recording medium; wherein the optimum spherical aberration and defocus values for an information read/write track are calculated from the stored optimum values by interpolation based on the track's position.

In the case of a multilayer recording medium, optimum spherical aberration and defocus are preliminarily measured at inner and outer tracks or both end positions in the top and bottom layers. When jumping to another layer, an offset is calculated by linear interpolation and added to the set spherical aberration just before the jump. (When jumping to another layer, an interpolative value between the values measured preliminarily for the inner and outer positions is used.)

Specifically, the optical information recording apparatus has a memory for storing the optimum spherical aberration values which are respectively for the top and bottom layers; wherein immediately before access is moved perpendicularly across one or more recording layers, the optimum spherical aberration to be set for the target layer is calculated from the stored optimum values by interpolation.

In addition, each of the aforementioned optical information recording apparatus can be configured such that: if an initialized (recorded, or formatted) disk (recording medium) is inserted, the adjustment is started from optimization for the amplitude of the readout signal; and if an not initialized recording medium is inserted, the adjustment is started from optimization for the amplitude of tracking error signal.

Since the spherical aberration can accurately be optimized regardless of aberrations due to assembling errors and optical components themselves, it is possible to raise the reliability of the readout signal. Also since accurate adjustment is possible even with an unrecorded (un-initialized) rewritable optical disk medium (recording medium) according to the present invention, a variety of recording media can be used for recording and reproducing information. In addition, since the present invention allows the spherical aberration to be adjusted so as to encompass the resulting shift of the optimum defocus, the waiting time imposed after a medium is inserted can be shortened, allowing the user to immediately operate the apparatus.

Accordingly, the present invention can provide a low cost, high recording density and high reliability easy-to-operate optical disk apparatus capable of treating various types of recording media.

BRIEF DESCRIPTION OF THE PREFERRED EMBODIMENTS

DETAILED DESCRIPTION OF THE PREFERRED EMBODIMENTS

Embodiments of the present invention will thereinafter be described with reference to FIGS. 1 through 21. To facilitate

Embodiment 1

Spherical Aberration/Defocus Adjustment Method for Rewritable Optical Disk

With reference to FIGS. 1 through 7, the following describes the general configuration of an optical disk apparatus (optical information recording apparatus) provided with a spherical aberration correcting function according to the present invention.

Figure 2:
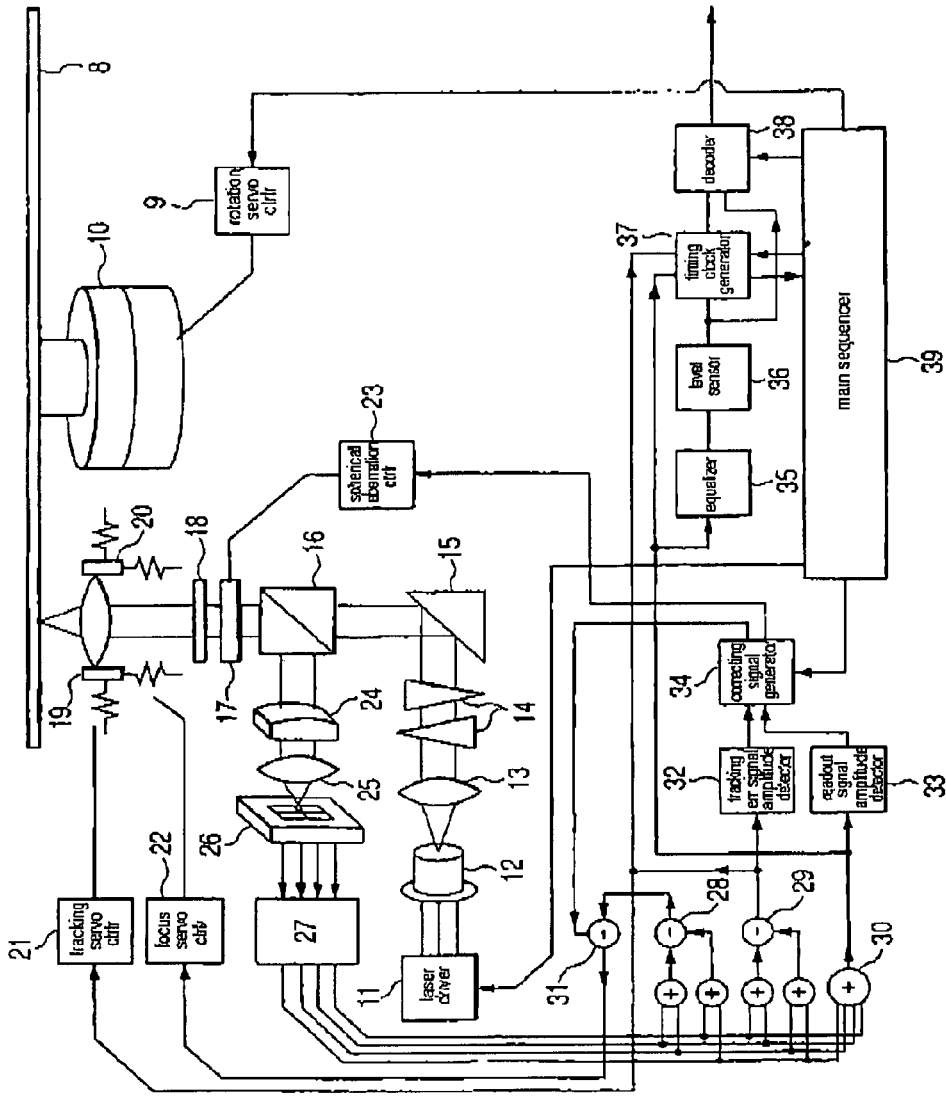
FIG. 2 shows the configuration of an optical information recording apparatus capable of correcting the spherical aberration according to the present invention.

Firstly, FIG. 2 shows the general configuration of an optical disk apparatus (optical information recording apparatus) provided with a spherical aberration correcting function according to the present invention.

(General Configuration of Optical System)

An optical disk 8 or a recording medium is mounted on a motor 10 whose rotation speed is controlled by a rotation servo controller 9. A laser diode 12 driven by a laser driver 11 irradiates this medium with light. After having passed through a collimating lens 13 and a beam-shaping prism 14, light from the laser diode 12 is guided toward the disk 8 by a reflecting mirror 15 which changes the direction of the light. The light reflected by the reflecting mirror 15 passes through a polarizing beam splitter 16, a liquid crystal aberration corrector 17 and a quarter wave plate 18. Then, the light is focused on the disk 8 by an objective lens 19. The objective lens 19 is mounted on an actuator 20 so that the focal position can be actuated in the track direction by a signal of a tracking servo controller 21 and in the focal direction by a signal of a focus servo controller 22. The liquid crystal aberration corrector 17 compensates for the substrate thickness error of the disk 8 and the spherical aberration of the objective lens. A control voltage from a spherical aberration controller 23 causes the spherical aberration corrector to have a distribution of the refractive index which differs depending on the distance from the center of the beam of light so as to correct the spherical aberration by compensating for aberrant advances or delays of the wave front. Correcting the spherical aberration allows the beam of light to be converged to an enough small beam spot to read a microscopic mark pattern recorded on the disk 8 and record a mark pattern on the disk 8. The irradiated beam of light is partly reflected by the disk 8 and passes again through the objective lens 19, the quarter wave plate 18 and liquid crystal aberration corrector 17. Then, the reflected light beam is split toward a cylindrical lens 24 by the polarizing beam splitter 16. The split light beam goes through the cylindrical lens 24 and the detection lens 25 and reaches four quadrant photodetectors 26 where the light beam is detected and converted to electrical signals. A photo-current amplifier 27 amplifies the electrical signals. By doing addition and subtraction on these signals, a tracking error signal generator 29 generates a tracking error signal, a focus error signal generator 28 generates a focus error signal and a readout signal generator 30 generates a readout signal. The amplitude of the tracking error signal is detected by a tracking error signal amplitude detector 32 to output the signal amplitude. The amplitude of the readout signal is also detected by a readout signal amplitude detector 33 to output the signal amplitude. These signal amplitude signals are received by a correcting signal generator 34. The configuration described so far is the same as the configuration of a common optical disk apparatus except for the sections concerning spherical aberration correction, i.e., the liquid crystal aberration corrector 17, the spherical aberration controller 23 and the correcting signal generator 34.

The obtained tracking error signal is also supplied to the tracking servo circuit 21 to control the position of the objective lens 19 in the track direction. The focus error signal, after added a defocus signal (focal position-correcting signal) by a defocus offset adder 31, is supplied to the focus servo controller 22 to control the defocus value of the objective lens 19. The readout signal also goes through an equalizer 35, a level sensor 36 and a timing clock generator 37 and is converted to the recorded original digital signal by a decoder 38. These circuits in a series are controlled in a unified manner by a main sequencer 39.

The correcting signal generator 34 receives the amplitude of the tracking error signal and the amplitude of the readout signal to generate the spherical aberration correcting signal and the defocus signal. The following describes how the correcting signal generator 34 operates.

(Spherical Aberration Correcting Signal Generator)

According to how the amplitude of the tracking error signal and that of the readout signal behave, the correcting signal generator 34 functions to generate a spherical aberration correcting value and an defocus value. The defocus value is an offset to the focus error signal. The target focal position is shifted by the offset from the position at which the focus error signal becomes zero. Hereinafter, such a focal position offset is called a defocus.

Figure 3:
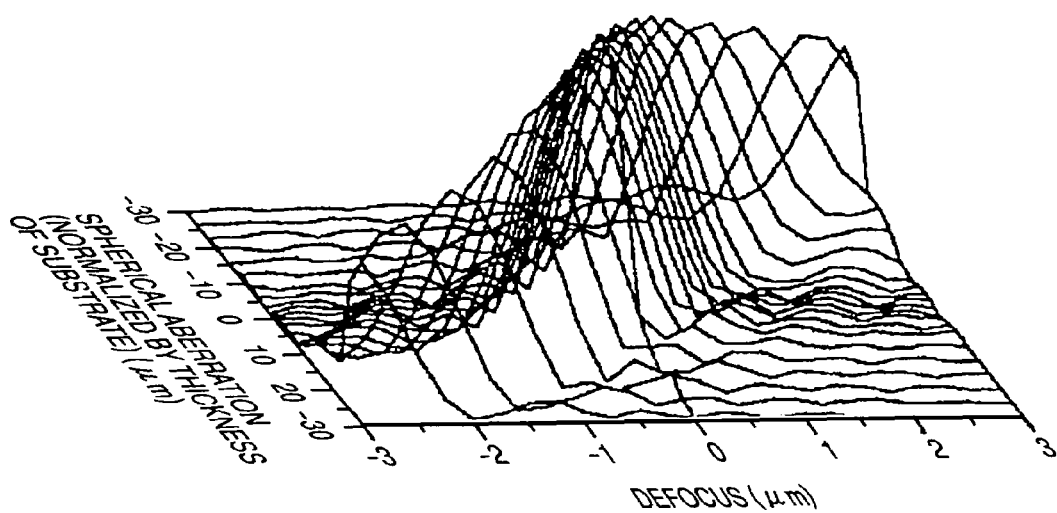
FIG. 3 shows an amplitude distribution of the tracking error signal.
Figure 4:
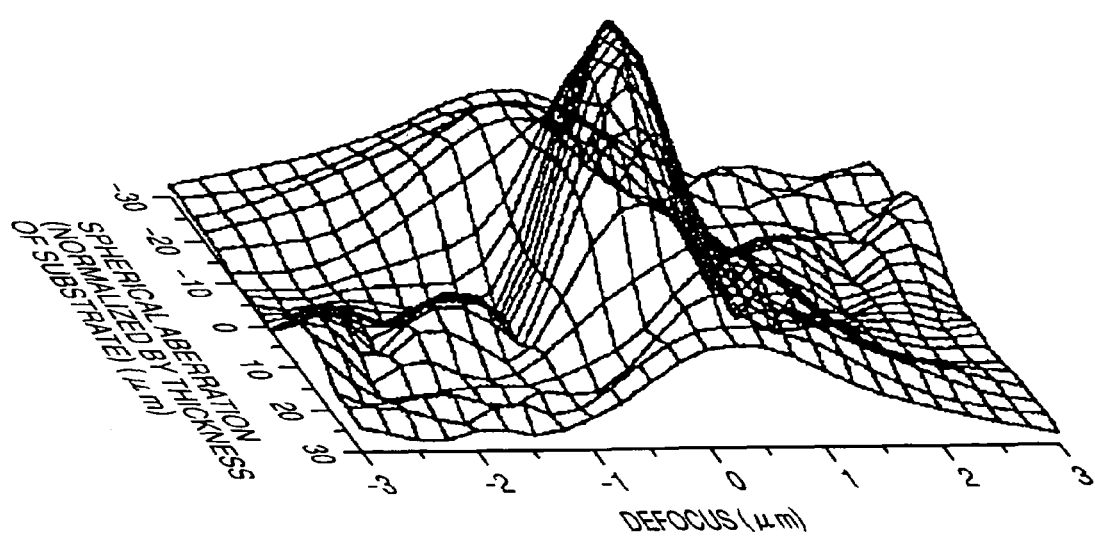
FIG. 4 shows an amplitude distribution of the readout signal.

FIGS. 3 and 4 respectively show how the amplitude of the tracking error signal and that of the readout signal appear with the presence of spherical aberration. Note that they are ideal conditions obtained by optical calculation.

FIG. 3 shows how the amplitude of the tracking error signal changes depending on the spherical aberration and the defocus. Its distribution, like a mountain chain, has a long and narrow peak in an oblique direction. This indicates that if the focal position is not correct, the tracking error signal has peak points offset from the in-focus position where the spherical aberration is corrected. To reach the highest elongate gentle peak point (the maximum amplitude of the tracking error signal), it is therefore necessary to adjust both spherical aberration and defocus concurrently. However, since the amplitude of the tracking error signal is likely to fluctuate depending on the tracked place of the disk during rotation, this tracking error signal-used adjustment is difficult to obtain a sufficient adjustment result. In addition, the determined highest peak point position is sometimes deviated from the correct in-focus position due to the optical system's other aberrations (astigmatism, etc.) than the spherical aberration.

FIG. 4 shows how the amplitude of the readout signal changes depending on the spherical aberration and the defocus. Its distribution has a relatively sharp central peak with many small peripheral pseudo peaks. Around the central peak, it is easy to find the correct in-focus position since the central peak is not oblique. Adjustment to the correct in-focus position can be realized by adjusting both spherical aberration and defocus alternately so as to reach the highest peak point (the maximum amplitude of the readout signal). The highest peak point position relatively stably agrees with the correct in-focus position regardless of the presence of other aberrations (astigmatism, etc.) In the case of an unrecorded disk (not initialized/formatted disk), however, the amplitude of the readout signal cannot be detected since it has no marks written thereon.

Figure 5:
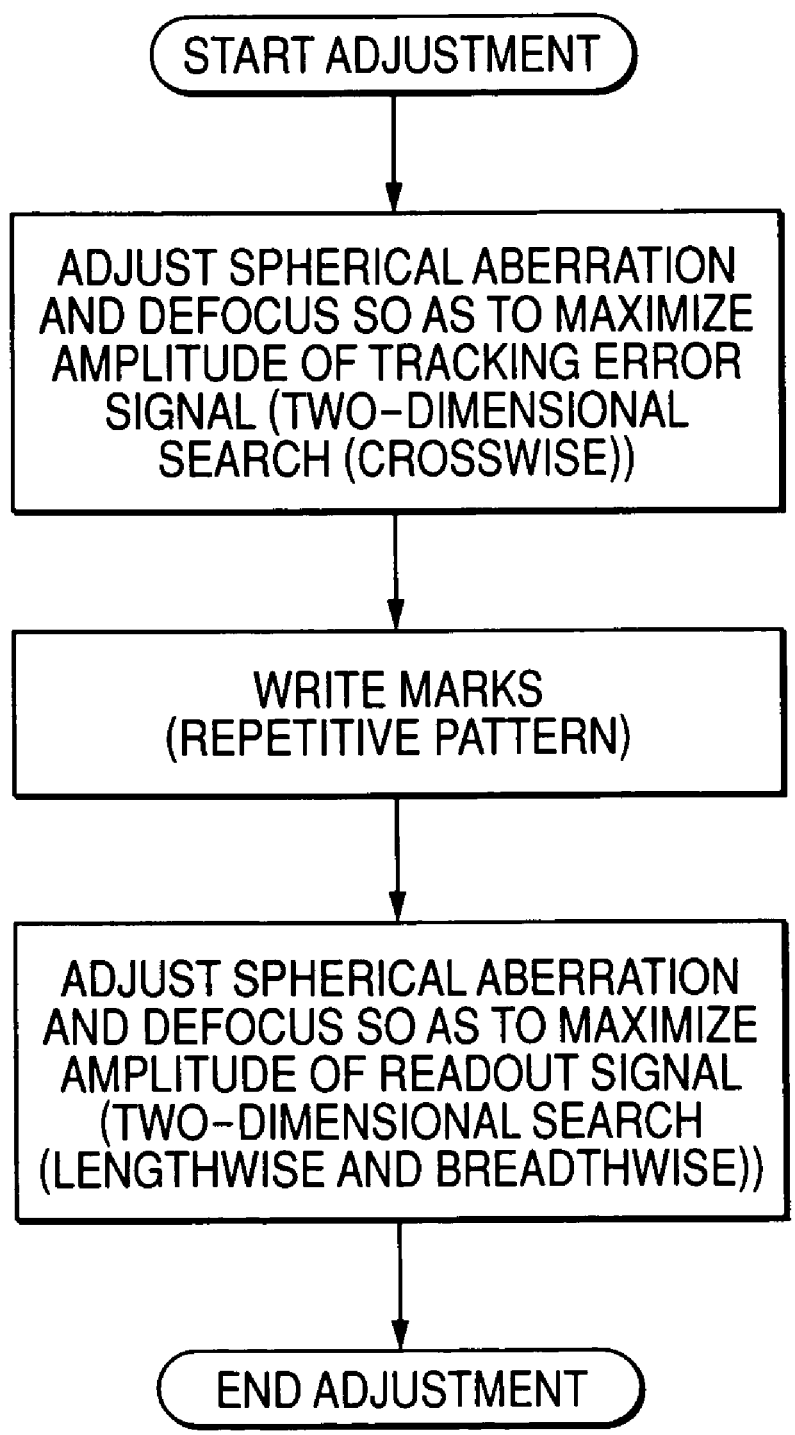
FIG. 5 shows an example of a procedure for adjusting the spherical aberration and defocus according to the present invention.

Accordingly, a two-stage adjustment procedure is inevitable to perform proper spherical aberration adjustment for an unrecorded disk. After both spherical aberration and defocus are concurrently adjusted so as to roughly maximize the amplitude of the tracking error signal as shown in FIG. 3, marks are written. Then, both spherical aberration and defocus are alternately adjusted so as to finely maximize the amplitude of a readout signal retrieved from the marks as shown in FIG. 4. This procedure is shown in the flowchart of FIG. 5.

It is the correcting signal generator 34 that performs the above-mentioned two-stage adjustment procedure based on a signal from the main sequencer 39. A defocus signal is output as a variation of the focal position whereas a spherical aberration correcting signal is output to the spherical aberration controller 23. Both spherical aberration correcting signal and defocus signal are concurrently adjusted so as to maximize the amplitude of the tracking error signal according to the above-mentioned procedure. Then, after marks are recorded, they are alternately adjusted so as to maximize the amplitude of the readout signal. By this, the optical system is adjusted to provide the correct in-focus position where the spherical aberration is corrected, that is, the spherical aberration is totally corrected.

Note that the spherical aberration correcting signal and the defocus signal can be adjusted by, for example, a two-dimensional search method. An example of a two-dimensional search procedure for this adjustment will be described later as an embodiment.

(Effect and Complement)

Since an unrecorded medium with no marks (or pits) can be used as the recording medium (optical disk 8), it is not necessary to record marks (pits) in advance. Therefore, this method is advantageous in cost.

In addition, the optical system required by this method is same in configuration as conventional ones except for the spherical aberration correcting mechanism. This is another advantage in cost since the optical head can directly use parts and circuits for conventional optical systems.

Further, since coarse adjustment is made by using the amplitude of the tracking error signal at first, a search for the maximum amplitude of the readout signal can be started in the vicinity of the central peak of the readout signal. This can prevent the search from converging to a pseudo peak of the readout signal. Therefore, this method is advantageous in adjustment reliability.

In addition, although the highest peak point of the tracking error signal may be influenced by other aberrations than spherical aberration, readjustment using the readout signal can automatically set the optical system to a proper in-focus condition. This is also advantageous in adjustment reliability.

That is, this two-stage adjustment procedure enables low cost and high reliability automatic adjustment by: adjusting the optical system so as to maximize the amplitude of the tracking error signal for a rewritable optical recording medium; recording marks thereon; and adjusting the optical system so as to maximize the amplitude of the readout signal from the marks.

Note that this method may also be applied to a differential push-pull system in which another photodetector for detecting a tracking error signal is added to the four quadrant photodetectors 26. The differential push-pull system use a differential push-pull signal instead of the above mentioned tracking error signal. The differential push-pull signal can be generated through the addition or subtraction of the tracking error signal and the added photodetector. Since this tracking error signal is identical in characteristics to the above-mentioned tracking error signal, the differential push-pull system can be employed in this adjustment method.

Figure 6:
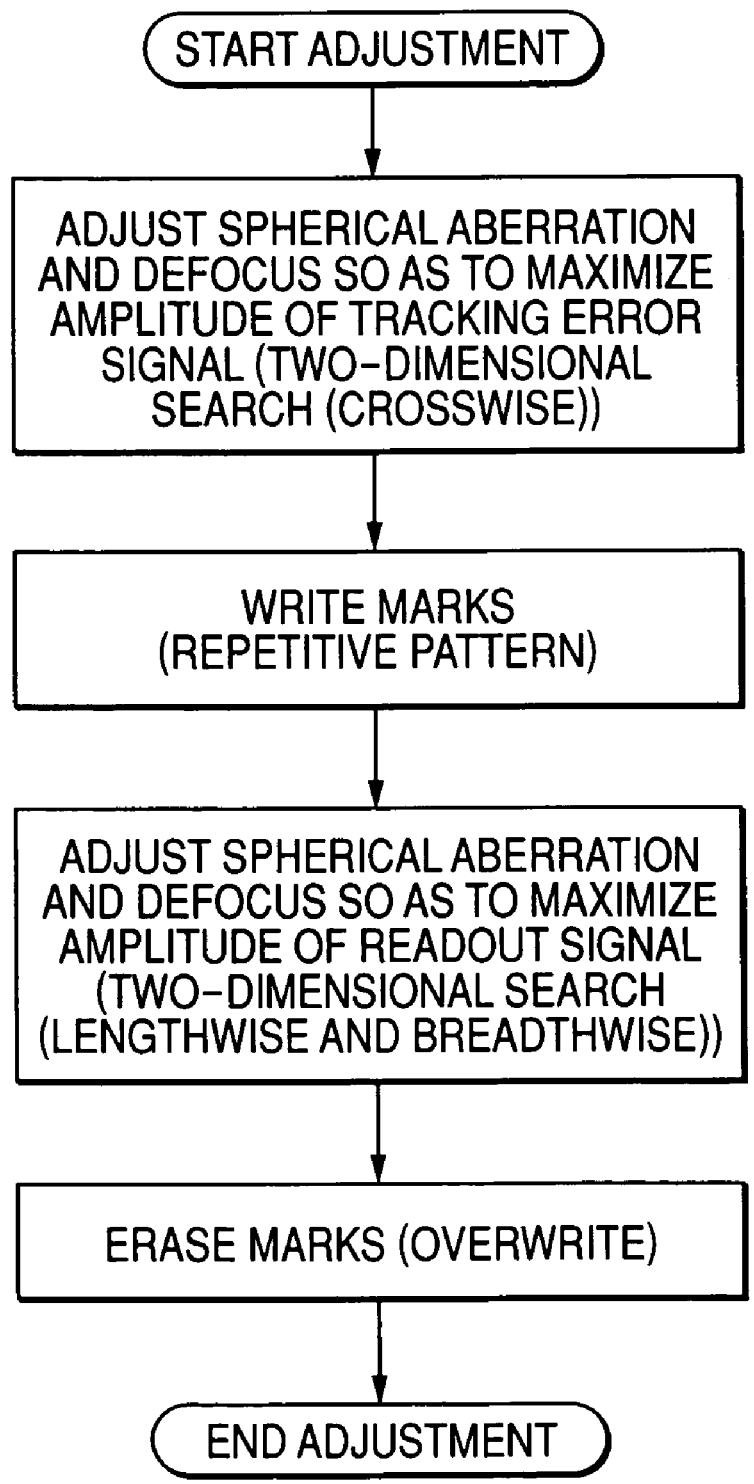
FIG. 6 shows an example of a procedure for adjusting the spherical aberration and defocus according to the present invention.

The marks recorded for adjustment may be overwritten or erased after the adjustment is complete. This procedure is shown in the flowchart of FIG. 6. This prevents the written marks, required temporally for adjustment, from causing trouble when information is written.

In addition, although a rotary recording medium such as an optical disk is assumed in the description of this embodiment, this adjustment method provides the same effect for non-rotary recording media such as a card type medium, too. In the case of a non-rotary recording medium, the tracking signal is constituted so as to indicate how much the tracking is deviated from the central line of aligned data written/recorded (on the recording medium). Like an optical disk, a groove structure is formed on the card type medium so that a tracking error signal can be obtained. The head and circuit configurations shown in the figure are applicable without any modifications.

Figure 7:
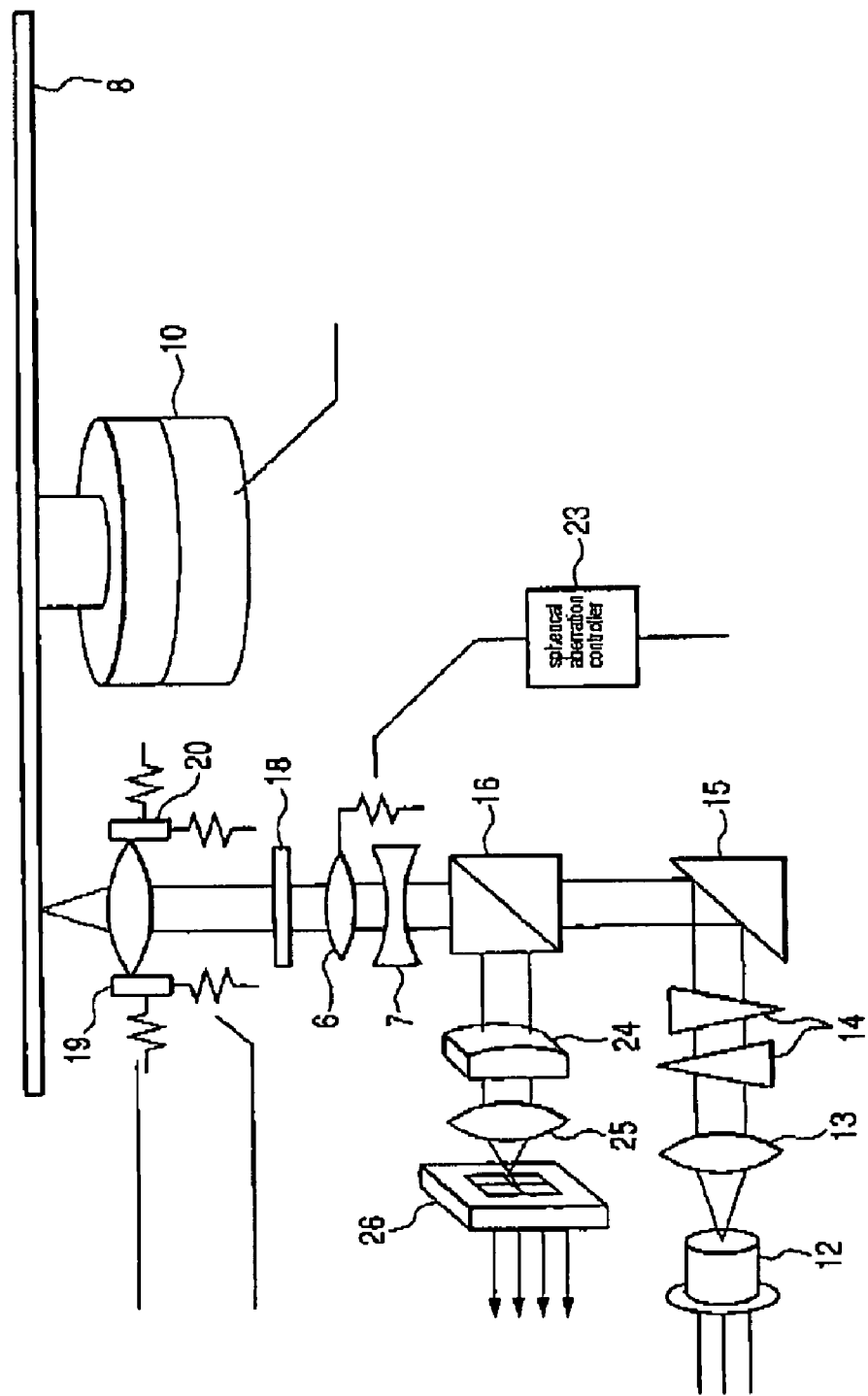
FIG. 7 shows the configuration of an optical system capable of correcting the spherical aberration to which the present invention is applicable.

In addition, although the liquid crystal aberration corrector 17 is assumed as means to correct the spherical aberration in the description of this embodiment, the liquid crystal corrector may be replaced by a combination of lenses. FIG. 7 shows a configuration in which a movable convex lens 6 combined with a concave lens 7 is used as the means to correct the spherical aberration. In this case, the movable convex lens 6 is displaced in proportion to the output of the spherical aberration controller 23. The distance between the lenses is changed in order to control the effective focal distance so as to compensate for the change of the spherical aberration which depends on the thickness of the substrate. The aforementioned spherical aberration and defocus adjustment procedure is also applicable to this configuration without modification.

Figure 1:
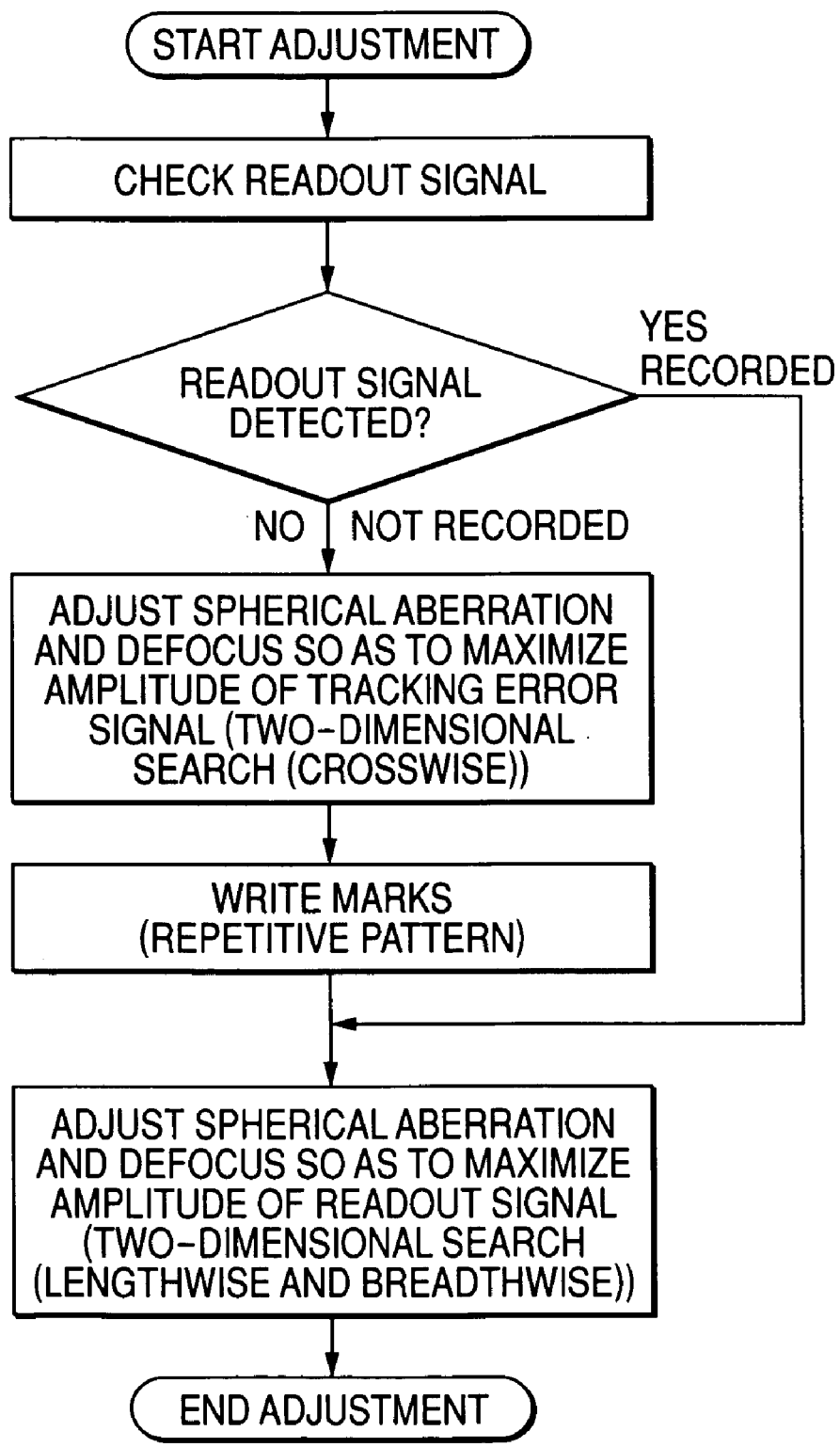
FIG. 1 shows an example of a procedure for adjusting the spherical aberration and defocus according to the present invention.

The aforementioned spherical aberration correcting procedure can be applied to an unrecorded disk, too. When the spherical aberration adjustment is made with a recorded (initialized) disk, the adjustment can be started from the step of searching for the maximum amplitude of the readout signal since marks are already recorded. Accordingly, the adjustment procedure can be designed as shown in the flowchart of FIG. 1 where readout signal check is made at first in order to judge whether the disk is a recorded disk or an unrecorded disk. Depending on the judgment, it is decided whether to start the adjustment from the maximum tracking error signal amplitude search step or from the maximum readout signal amplitude search step. This branching processing scheme can not only reduce the time of adjustment with a recorded disk but also perform proper spherical aberration adjustment with either disk. This measurement method has the merit of being able to reduce the time spent to adjust the spherical aberration with recorded disks.

Embodiment 2

Two-Dimensional Search Method

An example of a two-dimensional search procedure for spherical aberration/defocus adjustment according to the present invention is described below with reference to FIGS. 8 through 15.

(Two-Dimensional Search Method for Tracking Error Signal Amplitude)

With reference to FIGS. 8 through 11, the following describes a procedure for maximizing the amplitude of the tracking error signal.

Figure 8:
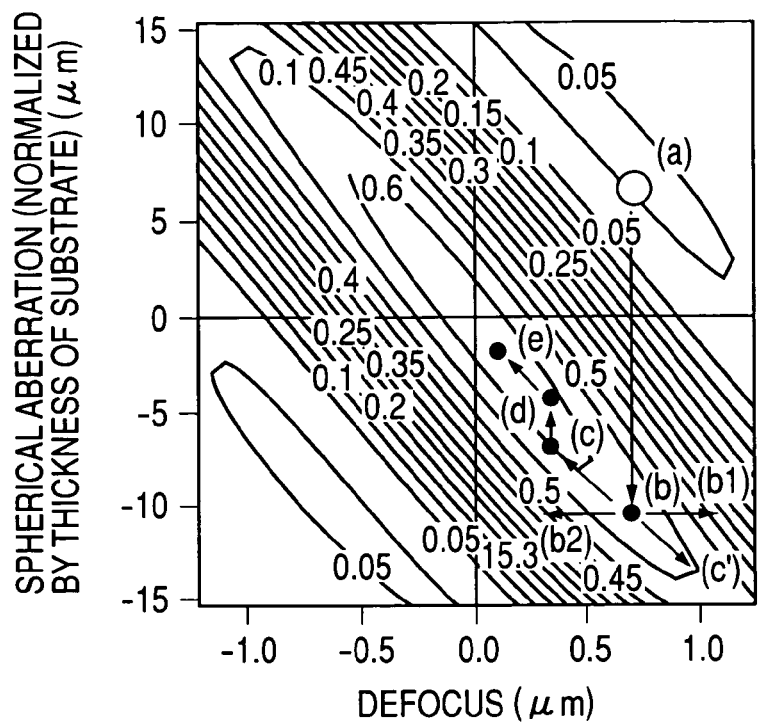
FIG. 8 shows an enlarged contour map indicating an amplitude distribution of the tracking error signal.

Firstly, FIG. 8 shows an enlarged central part of the tracking error signal's amplitude distribution shown in FIG. 3. FIG. 8 is depicted as a contour map. Note that as compared with FIG. 3, the axis of the spherical aberration is given opposite signs and therefore apparent slopes are opposite.

As mentioned in the description of the first embodiment, the distribution of the tracking error signal amplitude as a function of the spherical aberration and the defocus resembles a mountain chain having a peak elongated in an oblique direction. Therefore, the highest level for a given aberration differs depending on the defocus. This means that each time the spherical aberration is changed for peak search, the defocus must also be changed in order to search for the highest point in an oblique direction.

For example, assume a search is started from white circle (a). By changing the spherical aberration at first, point (b) is found at which the tracking error signal shows peak amplitude. Since point (b) exists on a ridge, adjusting only the defocus either rightward (b1) or leftward (b2) from point (b) results in decreasing the amplitude of the tracking error signal. To find a point at which the track error signal has a higher amplitude, it is therefore necessary to move in an oblique direction, for example, toward (c) or (c'). Further, point (d) is found from (c) and then point (e) is found from point (d) in searching for the highest peak point corresponding to the maximum amplitude of the tracking error signal.

That is, in order to properly locate the maximum amplitude of the tracking error signal, such two-dimensional oblique search steps must be included. Here, the two dimensions respectively correspond to the substrate thickness error and the defocus. As shown in FIG. 8, the locus of this search includes oblique lines (b)→(c) and (d)→(e). A search is called an oblique search if its locus is an oblique line.

Usually, the amplitude of the tracking error signal fluctuates depending on the angle of rotation of the disk since the disk has a focusable portion and a less focusable portion caused by partial warps and the like. Therefore, when detecting the amplitude of the tracking error signal, it is often necessary to wait until the disk makes "one revolution" for each amplitude detection. Increasing the number of detections makes longer the total search (adjust) time. Therefore, oblique search is much effective in reducing the total search time since the number of detections is decreased.

Note that while the above description includes the expression "to maximize the amplitude of the tracking error signal", this does not mean that the amplitude of the tracking error signal must completely be maximized. In FIG. 8, the central peak strength (strength at the center of the cross) is 0.626 (arbitrary strength). As far as the obtained amplitude is not lower than 0.60, the remaining spherical aberration and defocus errors can respectively be reduced to within 8 μm (equivalent substrate thickness error) and 0.7 μm from the correct in-focus position. If the adjustment with the amplitude of the tracking error signal is complete with such small errors, the subsequent adjustment with the readout signal can be started from a position within the foot of the central peak, allowing the search to accurately converge to the highest peak point of the readout signal's amplitude. That is, the expected effect described in this specification can be attained as far as the obtained amplitude of the tracking error signal is not smaller than 96% of the maximum value. In this specification, "maximization" includes such rough maximization.

Figure 9:
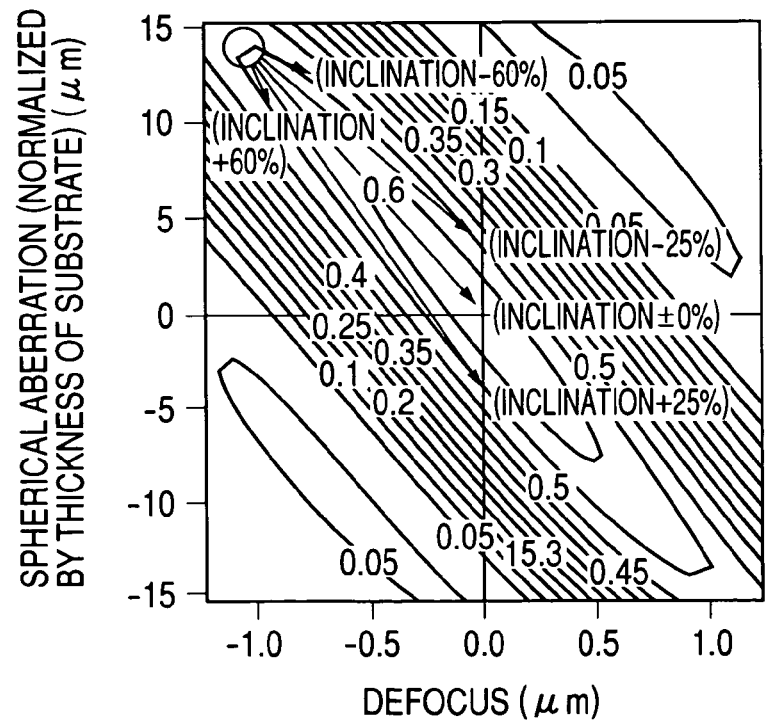
FIG. 9 shows an enlarged contour map indicating an amplitude distribution of the tracking error signal.

The convergence speed depends on how the search angle is deviated from the ideal search angle. Referring to FIG. 9, the convergence speed by the oblique search is more than twice that by the four-direction search if the tangent of the search angle is in the range of ±60% of the tangent of the ideal search angle. In addition, if the deviation from the ideal search angle is in the range of ±25%, half of the highest convergence speed (at ±0%) is obtained even at worst. Preferably, the search angle is determined so as to fall within such a range from the proper angle.

Ideally, the oblique search angle can be determined according to, for example, the following proportional expression:

$$\Delta z = -\frac{(n^2-1)}{4n^3} \cdot (NA)^2 \cdot \Delta t \qquad \text{Equation 1}$$

Where, $\Delta z$ is the defocus, $\Delta t$ is the substrate thickness error, n is the refractive index of the substrate and NA is the numerical aperture of the lens. In this equation, $\Delta z$ is calculated as the difference between the paraxial image point (Gaussian image point) and the ideal image point, which occurs due to the spherical aberration equivalent to substrate thickness error $\Delta t$, on the assumption that light is uniformly distributed in the range of the pupil radius corresponding to numerical aperture NA. When n=1.6 and NA=0.85, the proportion is constant as below:

$$\Delta z = -0.0688 \cdot \Delta t = -\frac{\Delta t}{14.5} \qquad \text{Equation 2}$$

This means that it is possible to move along a ridge toward the highest point of the tracking error signal amplitude if both spherical aberration and the defocus are changed concurrently by correction mechanism at a ratio of 14.5 μm (equivalent substrate thickness error) to 1 μm (defocus). However, the above equation is accurate only if the light flux incident on the lens has a uniform distribution in luminous energy. If the distribution is not uniform, the constant varies from 14.5 since the effective numerical aperture (NA) (generally) decreases. In addition, the constant is also affected by the ratio of the track interval to the resolution the beam spot. For example, the constant is as high as 25 in some actual optical heads. The value obtained according to the above equation is just for reference. In practice, the search angle is determined based on actual measurement for each specifically head designed optical head.

Figure 10:
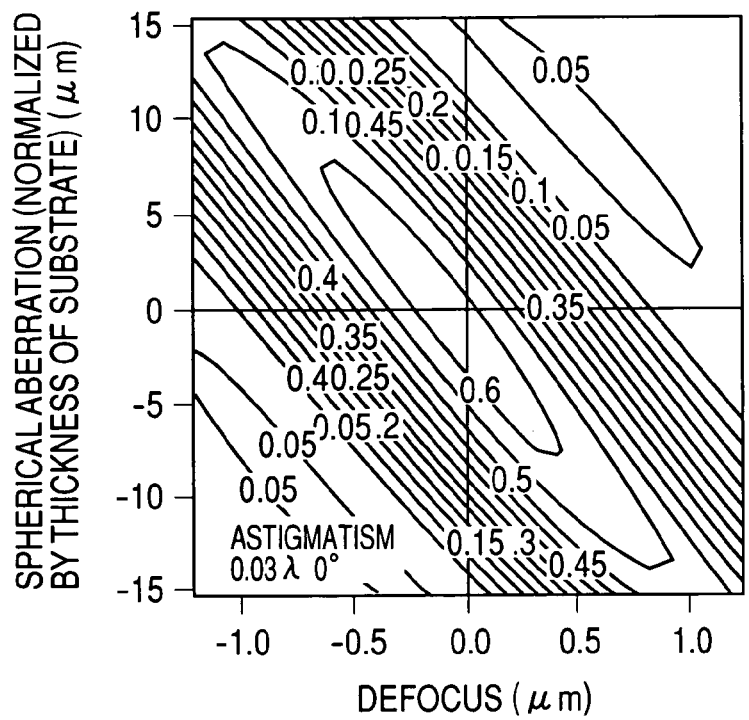
FIG. 10 shows an amplitude distribution of the tracing error signal obtained with presence of astigmatism.
Figure 11:
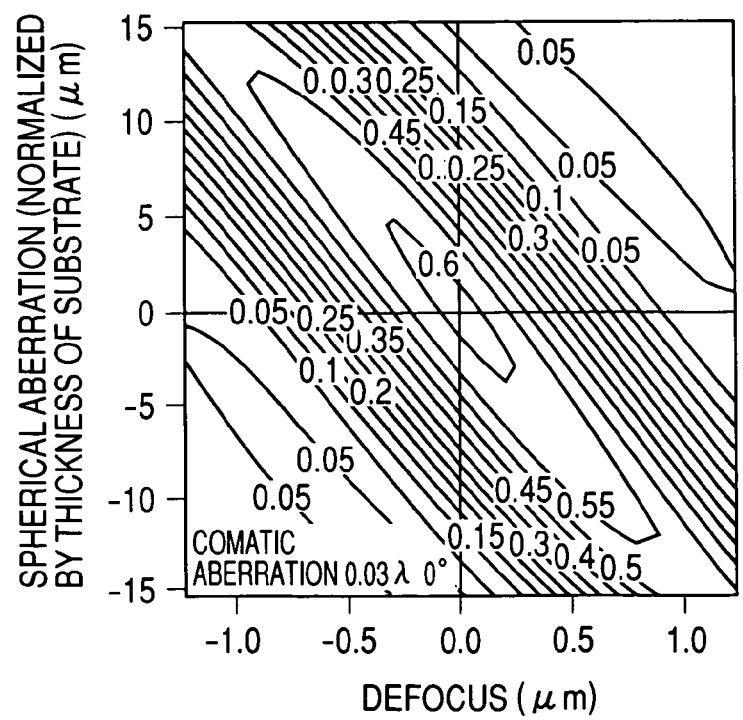
FIG. 11 shows an amplitude distribution of the tracking error signal obtained with presence of coma aberration.

In addition to spherical aberration, the optical system may also have other aberrations such as those attributable to the dimensional and positional errors of components. A distribution of the tracking error signal amplitude, depicted as a contour map in FIG. 10, is obtained with the presence of astigmatism whereas a distribution in FIG. 11 is obtained with the presence of coma aberration. Referring to FIG. 10, the central peak of the distribution is shifted left due to astigmatism. This means that adjustment to the highest peak point (maximum amplitude of the tracking error signal) does not always set the optical system to the correct in-focus condition. Accordingly, adjustment with the amplitude of the readout signal, as described below, is necessary.

In the first adjustment step to correct the spherical with the amplitude of the tracking error signal, a search for an optimum amplitude point can be done at high speed. Therefore, this method can reduce the waiting time imposed immediately after loading or during initialization.

(Two-Dimensional Search Method for Readout Signal Amplitude)

With reference to FIGS. 12 through 15, the following describes a search procedure for maximizing the amplitude of the readout signal.

Figure 12:
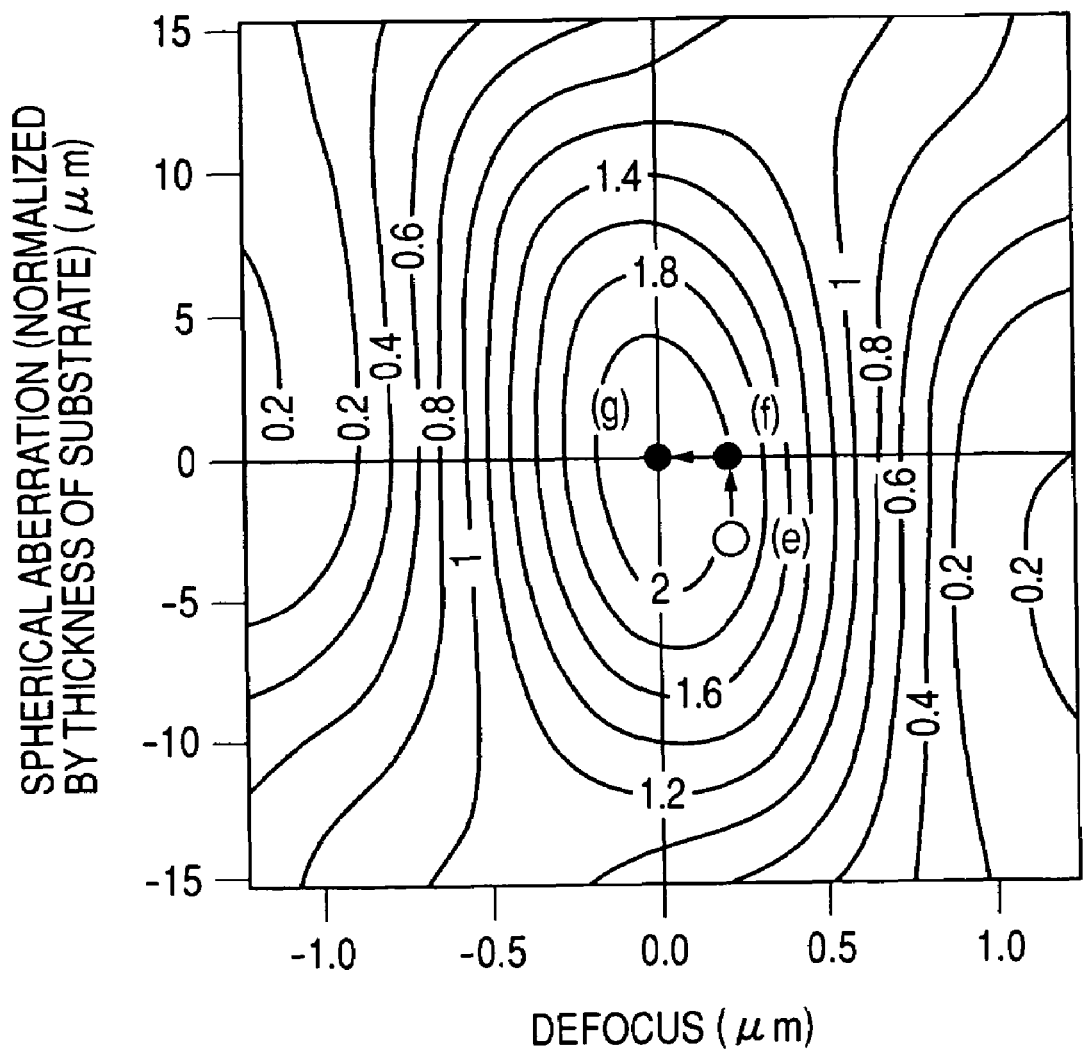
FIG. 12 shows an enlarged contour map indicating an amplitude distribution of the tracking error signal.

Firstly, FIG. 12 shows a central part of the readout signal amplitude distribution shown in FIG. 4. FIG. 12 is depicted as an enlarged contour map.

As mentioned in the description of the first embodiment, the distribution of the readout signal amplitude as a function of the spherical aberration and the defocus has a relatively sharp central peak with many small peripheral pseudo peaks. Since the central peak is not oblique, it is possible to reach the correct in-focus position (highest central peak point) by alternately changing the spherical aberration and the defocus.

For example, a search is started from white circle (e). By changing the spherical aberration at first, point (f) is found at which the readout signal shows the maximum amplitude. From this point, point (g) nearer to the highest peak point can be found as a higher amplitude point only by adjusting the defocus. This indicates that if the start point is in the vicinity of the central peak, it is possible to reach the highest peak point of the readout signal amplitude by alternately changing the spherical aberration and the defocus so as to increase the amplitude of the readout signal. That is, adjustment to the correct in-focus position can be realized by alternately adjusting the spherical aberration and the defocus toward the highest peak point (maximum amplitude of the readout signal). In the case of the readout signal amplitude, the two-dimensional search can be done substantially at the highest speed by simple alternate adjustment of the spherical aberration and the defocus. The locus of this search is rectangular in the two-dimensional plot plane as indicated by the arrows of FIG. 12. The search is called a rectangular search if its locus is rectangular.

Figure 13:
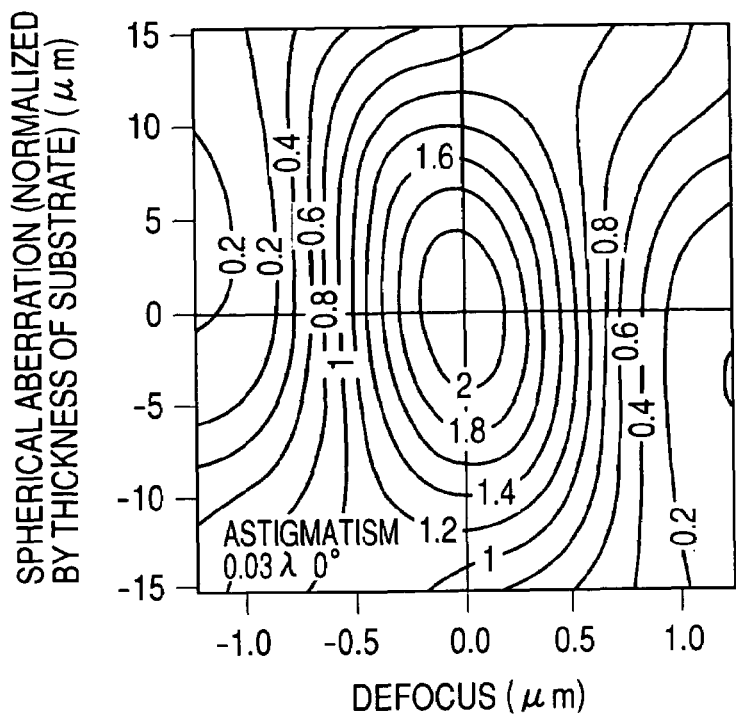
FIG. 13 shows an amplitude distribution of the readout signal obtained with presence of astigmatism.
Figure 14:
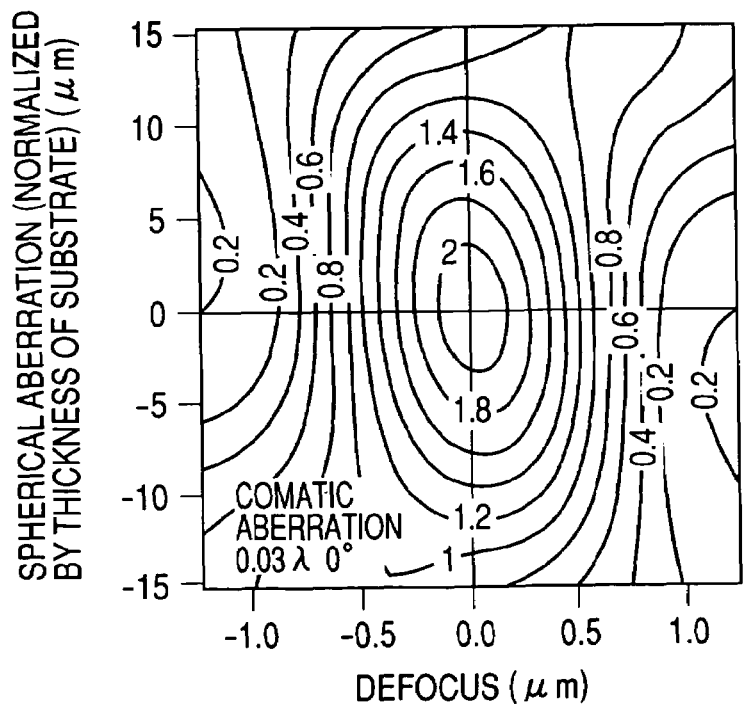
FIG. 14 shows an amplitude distribution of the readout signal obtained with the presence of coma aberration.

In addition to spherical aberration, the optical system may also have other aberrations such as those attributable to the dimensional and positional errors of components. A distribution of the readout signal amplitude, depicted as a contour map in FIG. 13, is obtained with the presence of astigmatism whereas a distribution in FIG. 14 is obtained with the presence of coma aberration. In the case of the readout signal, the peak center of the distribution agrees well with the center of the graph regardless of such aberration. This means that adjustment to the correct in-focus position is possible by searching for the highest peak point (maximum amplitude of the readout signal). That is, the resulting error of coarse adjustment with the tracking an error signal can properly be corrected by fine adjustment with the readout signal.

Contour maps indicating distributions of the readout signal amplitude in FIGS. 15A through 15D are respectively obtained by changing the period of the written mark pattern. The written pattern, from which the readout signal is retrieved, is a repetition of a mark portion followed by a space portion (no mark recorded) wherein the length ratio is 1:1. The mark period (total length of a mark portion and a space portion) is changed to 1.5 times, 2 times, 4 times and 6 times the track interval, as shown in FIGS. 15A, 15B, 15C and 15D, respectively. Usually, the track interval is set 10 to 20% smaller than the size of the beam spot from the viewpoint of efficiency in terms of recording density. Accordingly, the track interval in data areas in a typical optical recording disk/medium reflects the resolution of the beam spot.

Figure 15A:
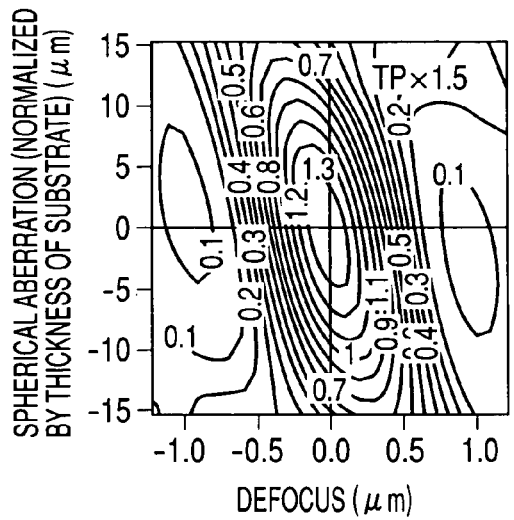
FIGS. 15A to 15D show how the amplitude distribution of the readout signal depends on the recorded mark pattern period.
Figure 15B:
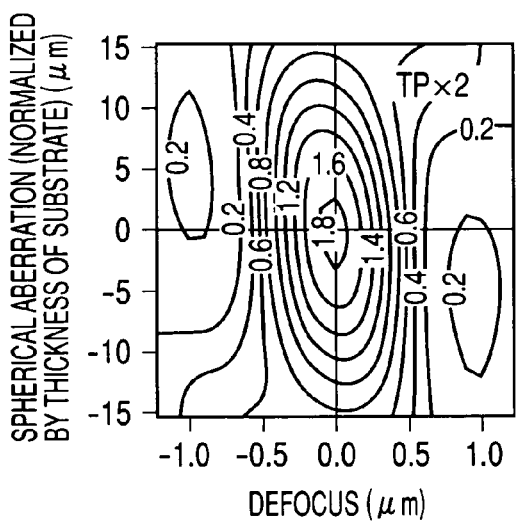
Figure 15C:
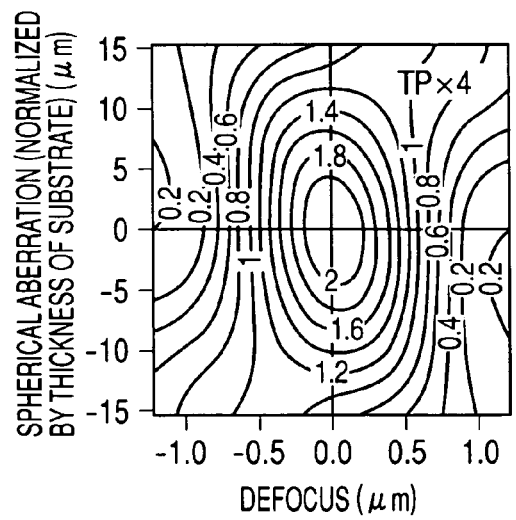
Figure 15D:
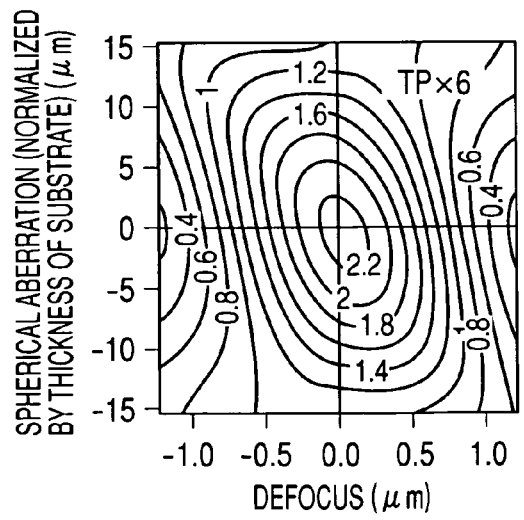

The distribution in FIG. 15A, which is obtained from marks recorded with the shortest mark period, is inclined a little. For the same reason as the description of the two-dimensional search for the maximum amplitude of the tracking error signal, the rectangular search, namely, the alternate adjustment of the spherical aberration and the defocus, somewhat slows down. On the other hand, the peak center (maximum amplitude point) of the distribution of FIG. 15D obtained with the longest mark period is shifted a little to the lower right side (deviated from the correct in-focus position). This indicates that the appropriate recorded mark interval is 2 to 4 times the track interval when the maximum amplitude of the readout signal is to be sought to locate the correct in-focus position. In addition, this range of mark intervals facilitates adjustment since the contour density around the peak is high.

A high contour density means that the adjustment sensitivity is high due to a large change of the readout signal amplitude caused by a change of the spherical aberration/defocus. The best mark interval is about 3 times between 2 times and 4 times.

Thus, the period of the written mark is set to an appropriate length. A repetitive mark pattern is recorded, as the written mark pattern, with a mark period equal to 2-4 times the track interval in the data area, whereby adjustment to the correct in-focus position can easily be realized by searching for the maximum amplitude of the readout signal. Since high adjustment sensitivity and high noise immunity can be realized by using such a mark pattern, this method carries the advantage that the cost of the adjustment control mechanism can be lowered.

The reason that the mark length is treated above in terms of the track interval is that the track interval reflects the size of the beam spot and therefore can be considered as one of the criteria for the resolution of the beam spot.

As mentioned so far, the spherical aberration and the defocus are adjusted in a two-dimensional plot plane where one axis represents the defocus while the other axis the correction of the spherical aberration, as shown in FIGS. 8 through 15. Oblique search is repeated at first so as to maximize the amplitude of the tracking error signal and then rectangular search is repeated so as to maximize the amplitude of the readout signal. Switching the search style makes it possible to reduce the search time and secure adjustment reliability.

(Effect and Complement)

Changing the search style is effective in raising the adjustment speed since the distribution of the tracking error signal amplitude is different in shape from that of the readout signal amplitude. The spherical aberration and the defocus are adjusted in a two-dimensional plot plane where one axis represents the defocus while the other axis the correction of the spherical aberration. The oblique search (not parallel to the two axes) is repeated at first so as to maximize the amplitude of the tracking error signal and then the rectangular search (parallel to either axis) is repeated so as to maximize the amplitude of the readout signal. This makes it possible to adjust the optical system both reliably and quickly as a whole.

This method is applicable to an unrecorded recording medium and can raise the total measurement speed while securing higher reliability adjustment of the spherical aberration. This makes it possible to efficiently adjust the spherical aberration and the defocus and therefore remarkably reduce the time required to adjust the optical axis. In addition, this results in providing the advantage that the waiting time imposed immediately after loading or during initialization can be shortened.

Note that in some case, the tilt (of the optical head relative to the recording medium) is adjusted in addition to the spherical aberration and the defocus. Such a system may be configured so as to perform three or four-dimensional search including the tilt (1 or 2 degrees of freedoms). It is also possible to adjust two quantities, for example, the spherical aberration and the defocus, in the two-dimensional plot plane with the remaining one or two quantities fixed. In the later case, the spherical aberration and the defocus can be adjusted by the oblique search and then by the rectangular search in the same manner as mentioned above.

In addition, since the spherical aberration can properly be adjusted to the optimum point regardless of the presence of astigmatism in the optical system, this method is applicable to a medium having thick plastic layers (cover layer and substrate layer) which are likely to cause aberration. That is, this method carries the advantage that higher density recording is possible since a stable beam spot can be obtained regardless of aberration.

Embodiment 3

(Adjustment of Spherical Aberration by Using Interpolative Values)

With reference to FIGS. 2 and 16 through 21, the following describes configurations of optical information recording apparatus that correct spherical aberration for a recording medium having a transparent layer whose thickness varies from place to place on the medium.

(Correction for Single Recording Layer, or One and the Same Recording Layer)

Figure 16:
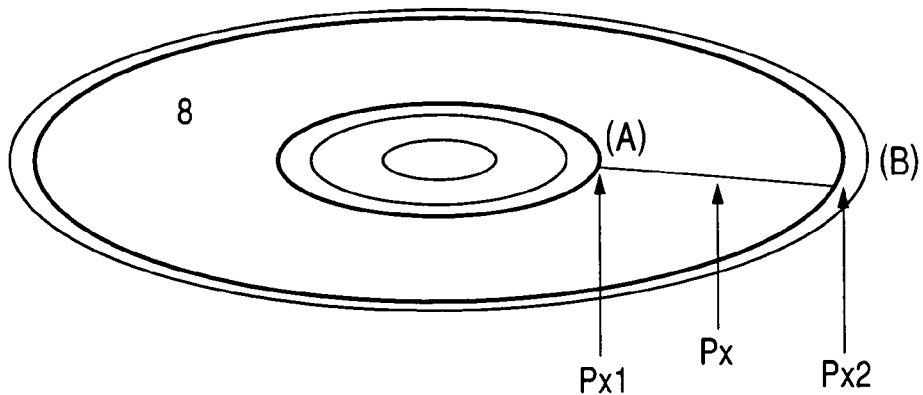
FIG. 16 is a diagram for explaining a coordinate system assumed for a single layer disk to which a correcting procedure is applied.
Figure 17:
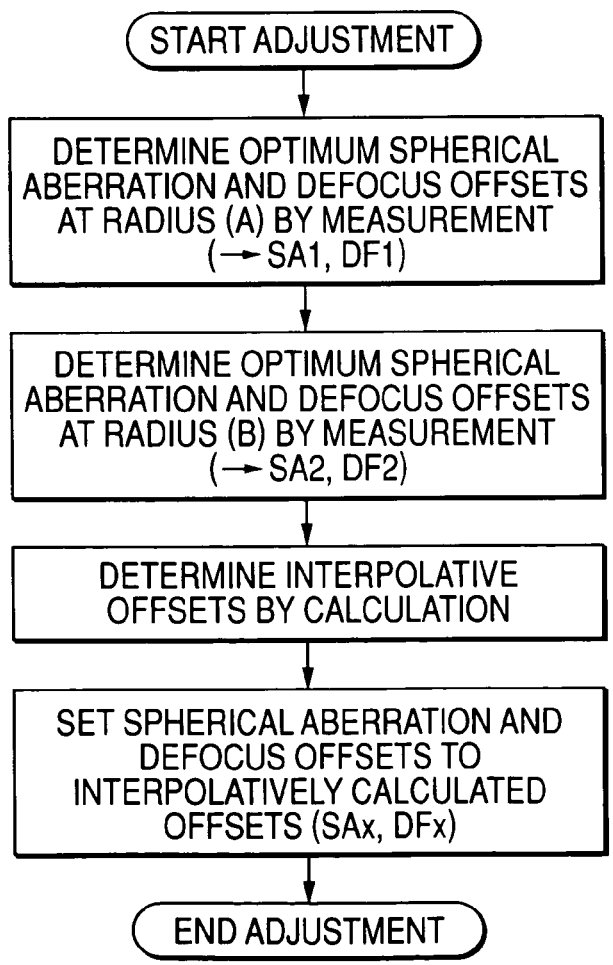
FIG. 17 shows a correcting procedure for a single layer disk.

Firstly, referring to FIGS. 16 and 17, the following describes the configuration of an optical information recording apparatus that corrects the spherical aberration so as to compensate for the thickness error of the transparent layer formed on the recording medium. It is assumed either that the recording medium has a single recording layer or that the recording medium has plural recording layers but correction is made for one of them.

FIG. 16 shows a recording disk medium having a single recording layer. A spherical aberration adjustment procedure, shown in FIG. 17 (flowchart), is applied to this recording medium. The optimum spherical aberration and defocus are measured at inner point A and outer point B by using the method mentioned in the description of the first and second embodiments. Ideally, point A is located in the innermost area whereas point B is located in the outermost area. Assume that SA1 and DF1 respectively denote the spherical aberration and defocus determined for point A. Likewise, SA2 and DF2 respectively denote the spherical aberration and defocus determined at point B.

By using them, spherical aberration SAx and defocus DFx at arbitrary radius Px on the recording medium (disk) are determined by interpolation as below:

$$SAx = SA1\frac{Px2 - Px}{Px2 - Px1} + SA2\frac{Px - Px1}{Px2 - Px1} \quad \text{Equation 3}$$

$$DFx = DF1\frac{Px2 - Px}{Px2 - Px1} + DF2\frac{Px - Px1}{Px2 - Px1}$$

In the above equation, Px1, Px2 and Px are the radii of arbitrary points on the disk, respectively. A specific implementation of this procedure is described below along with the configuration of FIG. 2. The main sequencer 39 gives Px, P1 and P2 to the correcting signal generator 34 wherein Px is the radius of a track for data read/write and P1 and P2 are the radii of inner point A and outer point B for which measurement was already made. The correcting signal generator 34 calculates spherical aberration SAx and defocus DFx for the radius Px track according to the above equation and outputs them respectively to the spherical aberration controller 23 and the defocus offset adder 31. In this manner, spherical aberration is corrected for any position on the recording medium (disk) by linear approximation.

This method is also applicable to not only non-rotary recording media such as a recording card medium but also multilayer recording disk media. If information is multi-dimensionally stored in X and Y directions, radial (track number) and stacking directions or the like, interpolation is made in each direction to calculate optimum spherical aberration and defocus for arbitrary coordinates in the multidimensional coordinate system. That is, the spherical aberration and defocus at any position in any shaped recording medium can be corrected for data read/write by linear approximation in substantially the same manner as for a single-layer recording disk.

In this configuration, optimum spherical aberration correction (and optimum defocus for the objective lens) is measured at inner and outer tracks on the medium. Optimum values for intermediary information read/write tracks are calculated by interpolation based on the optimum values measured for the inner and outer tracks and the calculated values are used to correct/control the defocus and spherical aberration.

In the case of a multilayer optical disk medium, the adjustment procedure is configured as described below.

Figure 18:
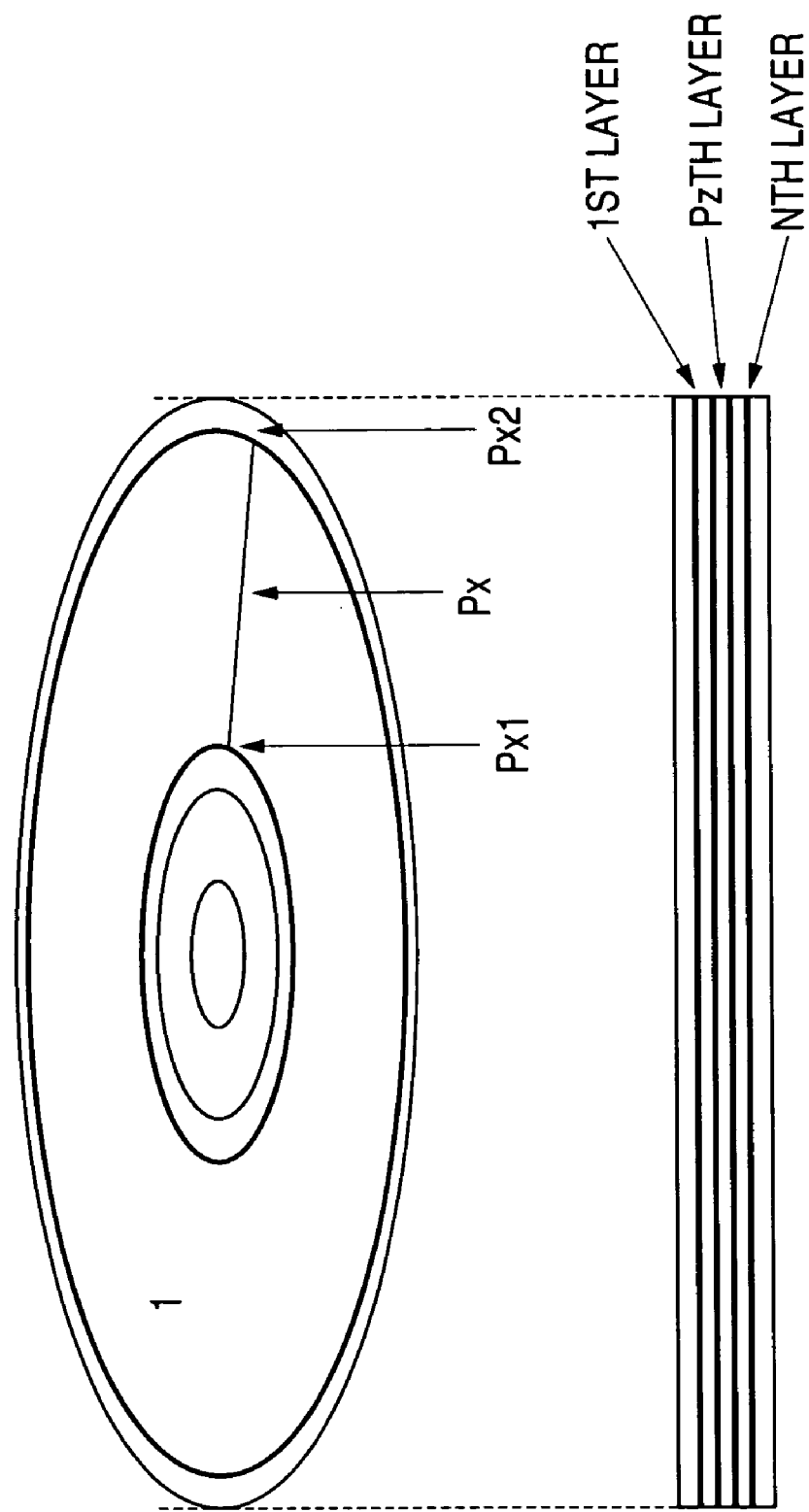
FIG. 18 is a diagram for explaining a coordinate system assumed for a multilayer disk to which a correcting procedure is applied.
Figure 19:
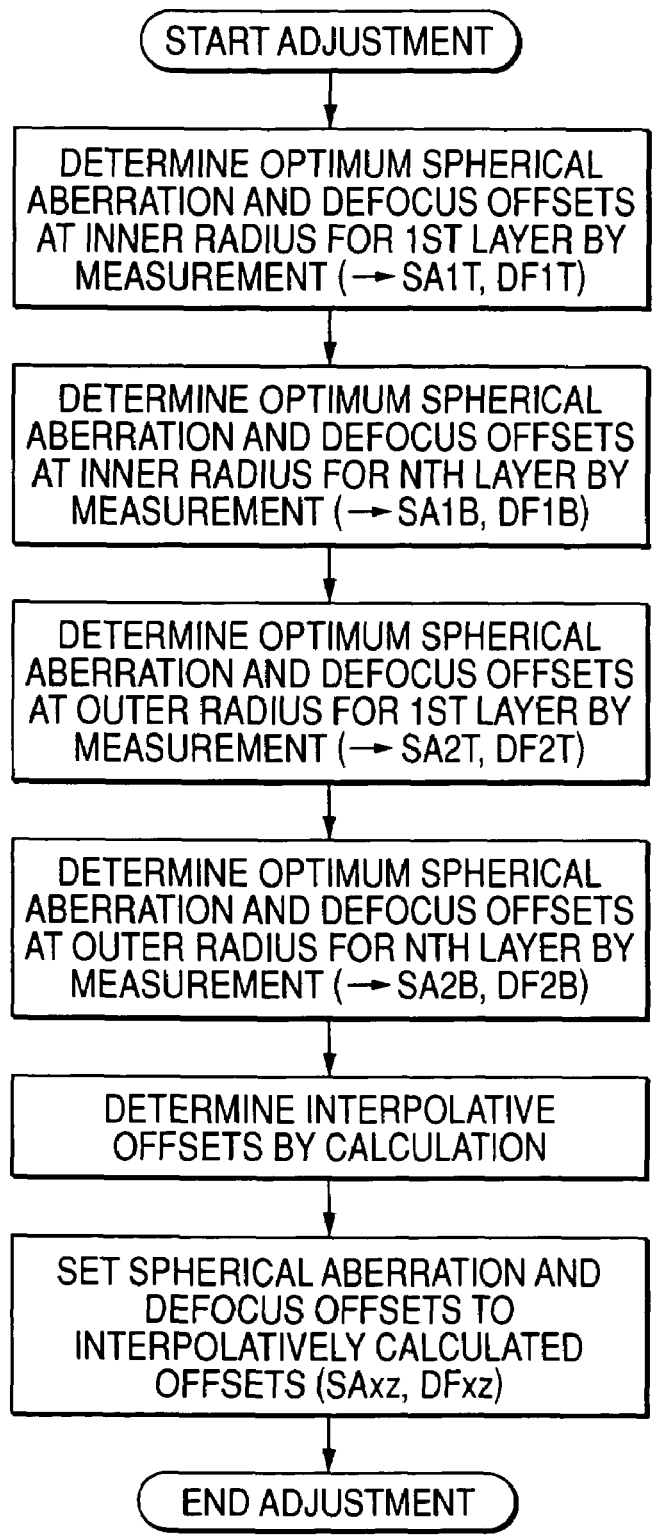
FIG. 19 shows a correcting procedure for a multilayer disk.

FIG. 18 shows a multilayer recording disk medium. A spherical aberration adjustment procedure, shown in FIG. 19 (flowchart), is applied to this recording medium. The medium has N recording layers stacked in direction 5 at regular intervals. Using the method mentioned in the description of the first and second embodiments, optimum spherical aberration and defocus are measured at inner and outer points in the top layer (1st layer) and then at the corresponding points in the bottom layer (Nth layer). Assume that SA1T, SA2T, SA1B, SA2B, DE1T, DF2T, DF1B and DF2B denote the respective measurement results.

By using them, spherical aberration SAxz and defocus DFxz for arbitrary position Px in the Pzth layer are calculated by interpolation as below:

$$SAxz = \left(SA1T\frac{Px2 - Px}{Px2 - Px1} + SA2T\frac{Px - Px1}{Px2 - Px1}\right)\frac{N - Pz}{N - 1} + \quad \text{Equation 4}$$
$$\left(SA1B\frac{Px2 - Px}{Px2 - Px1} + SA2B\frac{Px - Px1}{Px2 - Px1}\right)\frac{Pz - 1}{N - 1}$$
$$DFxz = \left(DF1T\frac{Px2 - Px}{Px2 - Px1} + DF2T\frac{Px - Px1}{Px2 - Px1}\right)\frac{N - Pz}{N - 1} +$$
$$\left(DF1B\frac{Px2 - Px}{Px2 - Px1} + DF2B\frac{Px - Px1}{Px2 - Px1}\right)\frac{Pz - 1}{N - 1}$$

A specific implementation of this procedure is described below along with the configuration of FIG. 2. The main sequencer 39 has the means to store Px, Pz, wherein Px and Pz designate a track in the recording medium for data read/write and SA1T, SA2T, SA1B, SA2B, DF1T, DF2T, DF1B and DF2b are spherical aberration and defocus values measured already for the top and bottom layers. The main sequencer 39 gives them to the correcting signal generator 34. The correcting signal generator 34 calculates spherical aberration SAxz and defocus DFxz for radius Px in the Pzth layer according to the above equation and outputs them respectively to the spherical aberration controller 23 and the defocus offset adder 31. In this manner, spherical aberration is corrected for any position in the recording medium by linear approximation.

This configuration has the means to store the optimum spherical aberration correction (and optimum defocus for the objective lens) measured at inner and outer tracks on the medium. Optimum values for intermediary information read/write tracks are calculated by interpolation based on the optimum values measured for the inner and outer tracks and the calculated values are used to correct/control the defocus and spherical aberration.

For the layer stacking direction, this configuration has the means to store the optimum spherical aberration correction measured for the top and bottom layers. When moving across plural recording layers, the spherical aberration is optimized for the target layer by interpolation based on the optimum values measured for the top and bottom layers.

In the case of a non-rotary multilayer medium, the adjustment procedure is configured as described below.

Figure 20:
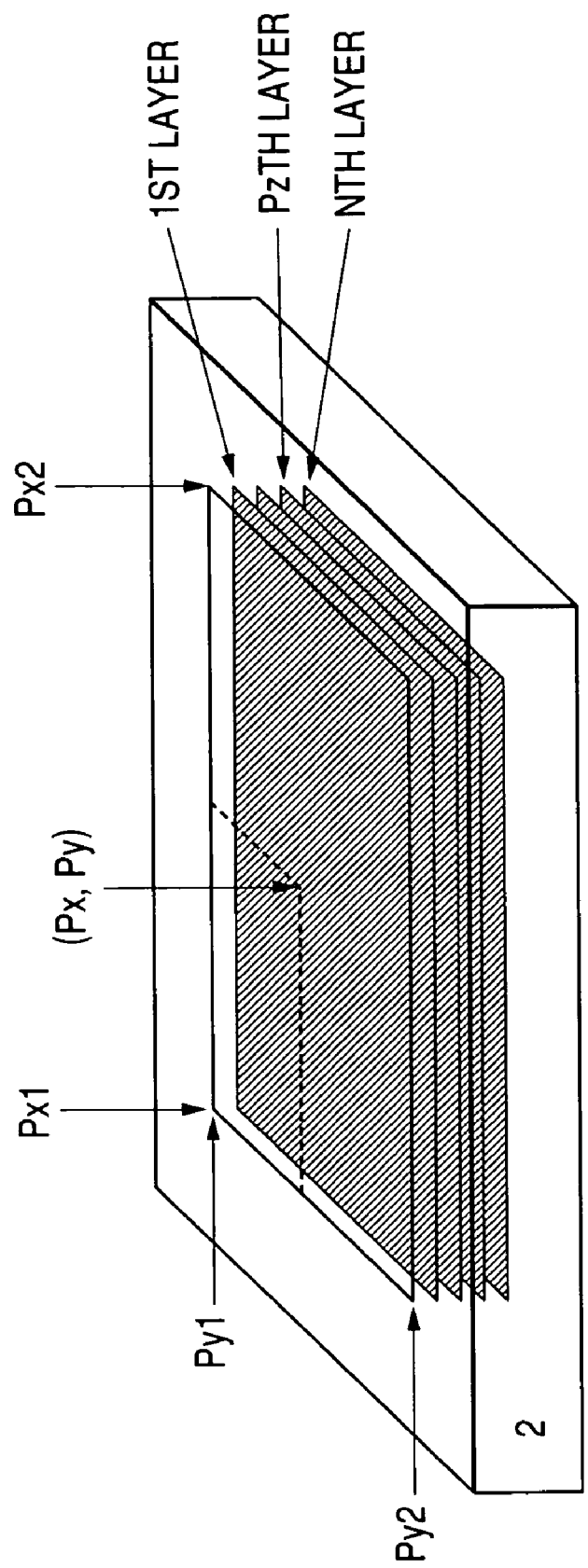
FIG. 20 is a diagram for explaining a coordinate system assumed for a multilayer recording card medium to which a correcting procedure is applied.
Figure 21:
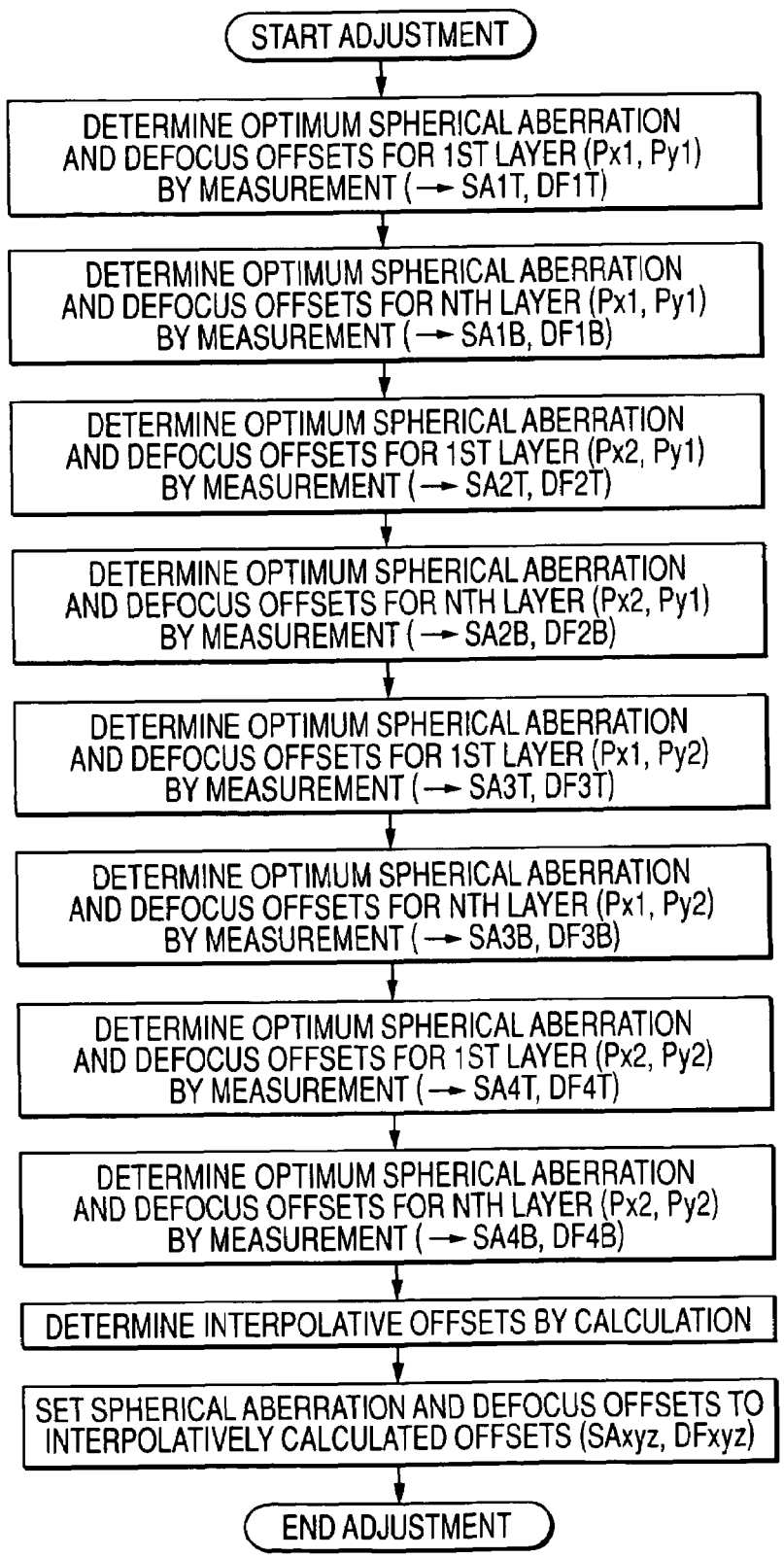
FIG. 21 shows a correcting procedure for a multilayer recording card medium.

FIG. 20 shows a multilayer recording card medium. A spherical aberration adjustment procedure, shown in FIG. 21 (flowchart), is applied to this recording medium 2. The medium has positions Px in X-direction 3, positions Py in Y-direction 4, and N recording layers stacked in direction 5 at regular intervals. Data is read/write from/to the recording layer at Pz-layer. Using the method mentioned in the description of the first and second embodiments, optimum spherical aberration and defocus are measured at the four corners (Px1, Py1), (Px2, Py1), (Px1, Py2) and (Px2, Py2) in the top layer (1st layer) and then at the corresponding points in the bottom layer (Nth layer). Assume that SA1T, SA2T, SA3T, SA4T, DF1T, DF2T, DF3T, DF4T, SA1B, SA2B, SA3B, SA4B, DF1B, DF2B, DF3B and DF4 respectively denote the corresponding measurement results.

By using them, optimum spherical aberration SAxyz and defocus DFxyz for arbitrary position (Px, Py, Pz) in the recording medium are calculated by interpolation as below:

$$SAxyz = \left( SA1T\frac{Px2-Px}{Px2-Px1} + SA2T\frac{Px-Px1}{Px2-Px1} \right)\frac{Py2-Py}{Py2-Py1}\frac{N-Pz}{N-1} +$$

$$\left( SA3T\frac{Px2-Px}{Px2-Px1} + SA4T\frac{Px-Px1}{Px2-Px1} \right)\frac{Py-Py1}{Py2-Py1}\frac{N-Pz}{N-1} +$$

$$\left( SA1B\frac{Px2-Px}{Px2-Px1} + SA2B\frac{Px-Px1}{Px2-Px1} \right)\frac{Py2-Py}{Py2-Py1}\frac{Pz-1}{N-1} +$$

$$\left( SA3B\frac{Px2-Px}{Px2-Px1} + SA4B\frac{Px-Px1}{Px2-Px1} \right)\frac{Py-Py1}{Py2-Py1}\frac{Pz-1}{N-1}$$

$$DFxyz = \left( DF1T\frac{Px2-Px}{Px2-Px1} + DF2T\frac{Px-Px1}{Px2-Px1} \right)\frac{Py2-Py}{Py2-Py1}\frac{N-Pz}{N-1} +$$

$$\left( DF3T\frac{Px2-Px}{Px2-Px1} + DF4T\frac{Px-Px1}{Px2-Px1} \right)\frac{Py-Py1}{Py2-Py1}\frac{N-Pz}{N-1} +$$

$$\left( DF1B\frac{Px2-Px}{Px2-Px1} + DF2B\frac{Px-Px1}{Px2-Px1} \right)\frac{Py2-Py}{Py2-Py1}\frac{Pz-1}{N-1} +$$

$$\left( DF3B\frac{Px2-Px}{Px2-Px1} + DF4B\frac{Px-Px1}{Px2-Px1} \right)\frac{Py-Py1}{Py2-Py1}\frac{Pz-1}{N-1}$$

Equation 5

A specific implementation of this procedure is described below along with the configuration of FIG. 2. The main sequencer 39 gives Px, Py, Pz, Px1, Px2, Py1, Py2 and N to the correcting signal generator 34 wherein Px, Py and Pz designate a position in the recording medium for data read/write, Px1, Px2, Py1, Py2 designate the four corner points and N defines the number of layers. The correcting signal generator 34 calculates optimum spherical aberration SAxyz and defocus DFxyz for the data read/write position according to the above equation and outputs them respectively to the spherical aberration controller 23 and to the defocus offset adder 31. In this manner, spherical aberration is corrected for any position in the recording medium by linear approximation.

For the X and Y directions, this configuration has the means to store the optimum spherical aberrations (and optimum defocuses for the objective lens) measured at the four corners. Optimum values for an intermediary information read/write position in a recording layer are calculated from the optimum values by interpolation based on the X and Y distances from the four corners and the calculated values are used to correct/control the defocus and spherical aberration.

For the layer stacking direction Z, this configuration has the means to store the optimum spherical aberrations measured for the top and bottom layers. When moving across plural recording layers, the spherical aberration is optimized for the target layer by interpolation based on the optimum values measured for the top and bottom layers.

(Effect)

In this method, spherical aberration can be corrected by linear interpolation for any position as mentioned above. In the case of a disk medium, spherical aberration can be optimized at any track or radius. In the case of a multilayer disk, spherical aberration can also be done properly when access jumps across plural layers. Since spherical aberration can properly be adjusted with these recording media, this adjustment method allows signals to be recorded/reproduced properly to/from these media.

(Total Effect)

As mentioned so far, the present invention allows an optical information recording apparatus to accurately adjust the spherical aberration more quickly and more reliably when any position is accessed.

Although many optical head structures have been proposed in order to allow optical information recording apparatus to correct spherical aberration, this method is advantageous in cost since this method can directly be applied to most of the existing optical heads provided with tracking error signal detecting function.

In addition, unlike the method disclosed in Japanese Patent Laid-open No. 2002-358677 which dynamically drives the spherical aberration detector/controller based on a diverged light beam, this method can reduce the total circuit noise since it is not necessary to incorporate many photo-detectors and photo-amplifiers.

Therefore, it is possible to provide a lower cost and higher reliability optical disk apparatus (optical information recording apparatus) capable of correcting the spherical aberration.

What is claimed is:

1. An optical information recording apparatus which optically reads and writes information from and to a recording medium, comprising:

a first detector for detecting amplitude of a readout signal;
a second detector for detecting amplitude of a tracking error signal;
a first adjustor for adjusting spherical aberration;
a second adjustor for adjusting defocus of an objective lens;
an oblique search means for changing the spherical aberration and the defocus obliquely in a two-dimensional rectangular coordinate system whose respective axes represent the defocus and the spherical aberration;
a rectangular search means for changing the spherical aberration and the defocus rectangularly in the two-dimensional rectangular coordinate system; and a switching means for switching the oblique search means and the rectangular search means when adjusting coarsely and finely;

wherein:

the spherical aberration and the defocus are adjusted at first obliquely by the oblique search means so as to maximize the amplitude of the tracking error signal and then adjusted rectangularly by the rectangular search means so as to maximize the amplitude of the readout signal, the recording medium is a non-rotary recording medium, said apparatus further comprises a memory for storing optimum spherical aberration values and optimum defocus values which are respectively for four corners on the recording medium, and the optimum spherical aberration and defocus values for an information read/write position are calculated from the stored optimum values by interpolation based on ratios in terms of distances from the four corners.

2. An optical information recording apparatus according to claim 1, wherein:

in case that an initialized recording medium is inserted, the adjustment is started from optimization for the amplitude of the readout signal; and in case that a not initialized recording medium is inserted, the adjustment is started from optimization for the amplitude of the tracking error signal.

3. An optical information recording apparatus which optically reads and writes information from and to a recording medium, comprising:

a first detector for detecting amplitude of a readout signal;

a second detector for detecting amplitude of a tracking error signal;

a first adjustor for adjusting spherical aberration;

a second adjustor for adjusting defocus of an objective lens;

an oblique search means for changing the spherical aberration and the defocus obliquely in a two-dimensional rectangular coordinate system whose respective axes represent the defocus and the spherical aberration; and a rectangular search means for changing the spherical aberration and the defocus rectangularly in the two-dimensional rectangular coordinate system;

wherein the spherical aberration and the defocus are adjusted by the oblique search means so as to maximize the amplitude of the tracking error signal from an unrecorded rewritable optical recording medium, marks are recorded on the optical recording medium, and then the spherical aberration and the defocus are adjusted by the rectangular search means so as to maximize the amplitude of the readout signal, wherein the recorded marks constitute a repetitive pattern whose mark interval is 2 to 4 times a track interval in a data area.

* * * * *